(12) United States Patent
Shi

(10) Patent No.: US 12,497,975 B2
(45) Date of Patent: Dec. 16, 2025

(54) AIR BLOWER

(71) Applicant: Kaihui Shi, Jiangsu (CN)

(72) Inventor: Kaihui Shi, Jiangsu (CN)

( * ) Notice: Subject to any disclaimer, the term of this patent is extended or adjusted under 35 U.S.C. 154(b) by 0 days.

(21) Appl. No.: 18/820,891

(22) Filed: Aug. 30, 2024

(65) Prior Publication Data

US 2025/0180034 A1 Jun. 5, 2025

(30) Foreign Application Priority Data

Dec. 1, 2023 (CN) .......................... 202323277118.2

(51) Int. Cl.
 *F04D 29/42* (2006.01)
 *F04D 13/06* (2006.01)
 *F04D 25/08* (2006.01)
 *F04D 29/28* (2006.01)

(52) U.S. Cl.
 CPC ......... *F04D 29/4206* (2013.01); *F04D 13/06* (2013.01); *F04D 25/084* (2013.01); *F04D 29/281* (2013.01); *F04D 29/424* (2013.01)

(58) Field of Classification Search
 CPC .... F04D 29/4206; F04D 13/06; F04D 29/281; F04D 27/004; F04D 25/084; F04D 29/424; A47L 5/14; A01G 1/125; E01H 1/0809
 See application file for complete search history.

(56) References Cited

U.S. PATENT DOCUMENTS

| | | | | |
|---|---|---|---|---|
| 6,442,790 B1* | 9/2002 | Svoboda | ................ | A01G 20/47 |
| | | | | 15/422 |
| 6,514,036 B2* | 2/2003 | Marshall | ............... | F04D 29/666 |
| | | | | 415/206 |
| 8,918,956 B2* | 12/2014 | Pellenc | .................. | A01G 20/47 |
| | | | | 15/344 |
| 9,603,497 B2* | 3/2017 | Yamaoka | ............... | A01G 20/47 |
| 11,617,312 B2* | 4/2023 | Zhou | ................... | F04D 25/0673 |
| | | | | 417/234 |
| 11,778,960 B2* | 10/2023 | Olvera | ................. | A47L 9/2842 |
| | | | | 15/405 |

* cited by examiner

*Primary Examiner* — Charles G Freay
*Assistant Examiner* — Lilya Pekarskaya

(57) ABSTRACT

An air blower includes a shell, an air supply device, and a handle. The air supply device is designed as a double-sided air supply structure, and is provided with two wind wheels. The theoretical air volume can be doubled relative to the design of single-sided air inlet so that the air blowing cleaning effect of the complete machine is improved.

19 Claims, 6 Drawing Sheets

AIR BLOWER

CROSS-REFERENCE TO RELATED APPLICATIONS

The application claims priority of Chinese patent application CN2023232771182, filed on Dec. 1, 2023, which is incorporated herein by reference in its entireties.

TECHNICAL FIELD

The present disclosure relates to the field of air blowers, in particular to an air blower.

BACKGROUND

Most of the existing products are driven by a single wind wheel with single-sided air inlet, and sufficient air volume cannot be provided when the products are used in some scenes.

SUMMARY

In order to overcome the shortcomings of the prior art, the present disclosure provides an air blower.

An air blower, includes:
a shell, the shell being provided with an air inlet and an air outlet; and
an air supply device, the air supply device being arranged inside the shell, and the air supply device being located between the air inlet and the air outlet; the air supply device includes a fan blade assembly, one side of the fan blade assembly being provided with a first wind wheel, the other side of the fan blade assembly being provided with a second wind wheel, and the first wind wheel and the second wind wheel being used for driving airflow to pass through the air inlet and the air outlet in sequence.

As an improvement of the present disclosure, the air supply device also includes a motor, the motor is provided with a driving rotating shaft, the air supply device also includes a support, the motor is arranged inside the support, the support is provided with a first connecting part, the support is connected with the shell through the first connecting part, and the driving rotating shaft goes through the support and is connected with the fan blade assembly.

As an improvement of the present disclosure, the air supply device also includes a gasket, the gasket is arranged between the motor and the fan blade assembly, a connecting hole is also formed in the fan blade assembly, and the connecting hole sleeves the rotating shaft.

As an improvement of the present disclosure, the fan blade assembly is also provided with a partition plate, the partition plate is located between the first wind wheel and the second wind wheel and used for partitioning the first wind wheel and the second wind wheel, the first wind wheel is provided with a plurality of first wind blades, the second wind wheel is provided with a plurality of second wind blades, and the first wind blades and the second wind blades are mutually staggered.

As an improvement of the present disclosure, the air inlet includes a first air inlet unit and a second air inlet unit, a first air flue is formed between the first air inlet unit and the first wind wheel, a second air flue is formed between the second air inlet unit and the second wind wheel, the first wind wheel drives airflow to pass through the first air inlet unit, the first air flue, the first wind wheel and the air outlet in sequence to form high-speed airflow, and the second wind wheel drives airflow to pass through the second air inlet unit, the second air flue, the second wind wheel and the air outlet in sequence to form high-speed airflow.

As an improvement of the present disclosure, the air blower also includes a handle, the handle is connected with the shell.

As an improvement of the present disclosure, the air blower also includes an extension device, the extension device is detachably arranged at the air outlet.

As an improvement of the present disclosure, the extension device includes an air outlet extension tube and an air outlet nozzle, one end of the air outlet extension tube is detachably connected with the air outlet, and the other end of the air outlet extension tube is detachably connected with the air outlet nozzle.

Beneficial effects: The present disclosure provides an air blower. The air blower includes a shell, an air supply device and a handle. The air supply device is designed as a double-sided air supply structure, and is provided with two wind wheels. The theoretical air volume can be doubled relative to the design of single-sided air inlet, so that the air blowing cleaning effect of the complete machine is improved.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
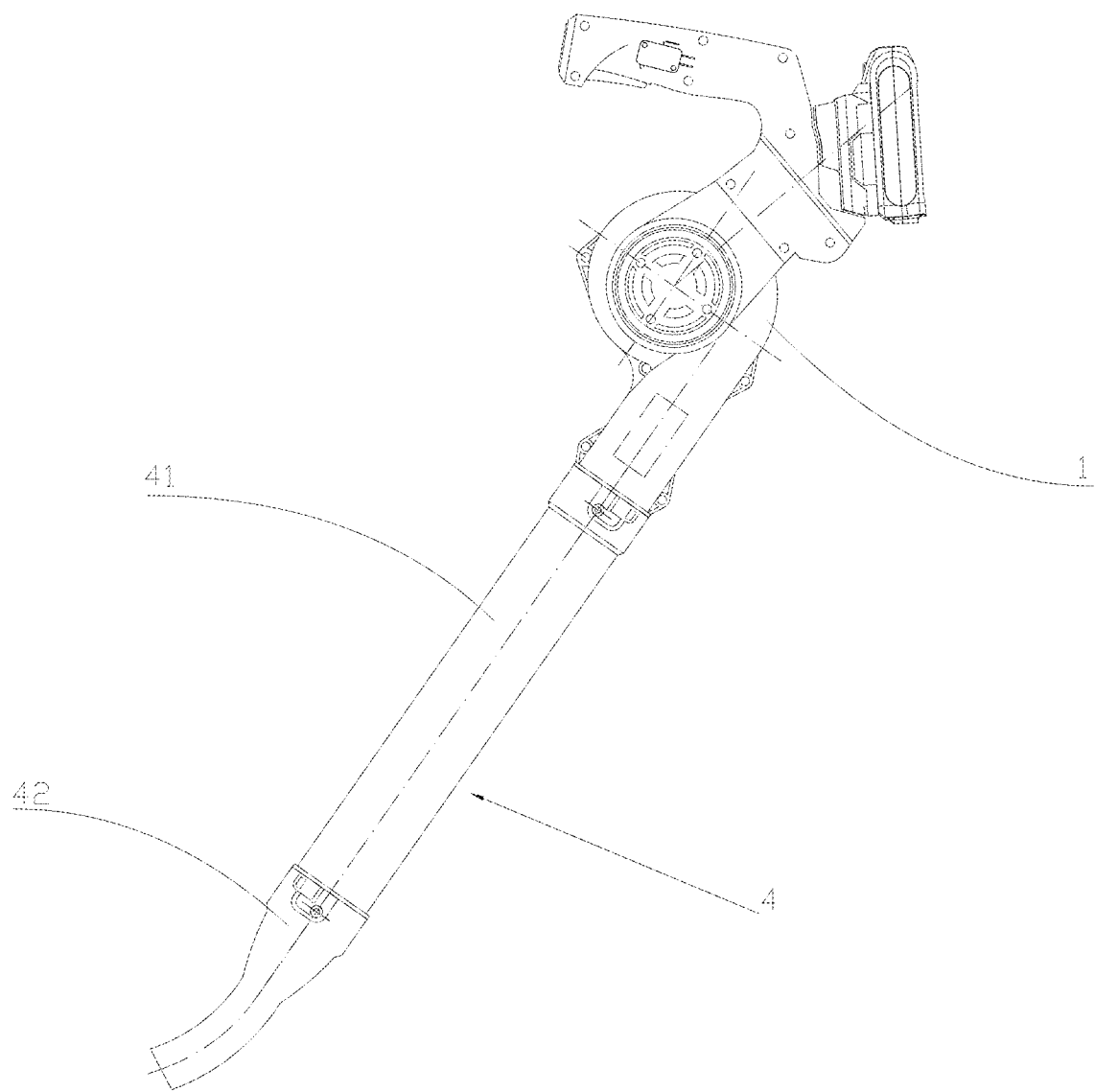
FIG. 1 is a front view of an air blower in the present disclosure.
Figure 2:
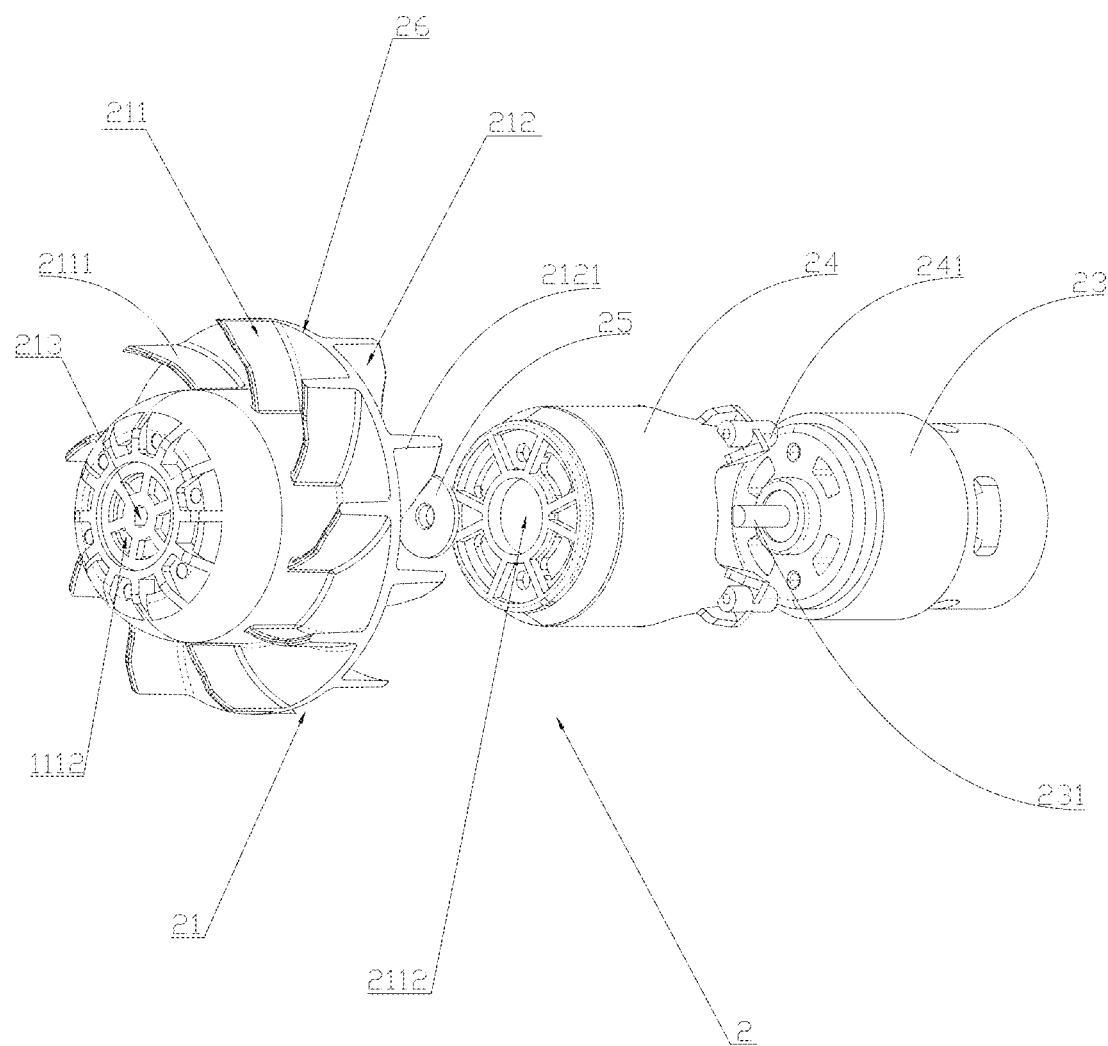
FIG. 2 is an explosive view of an air supply device of an air blower in the present disclosure.
Figure 3:
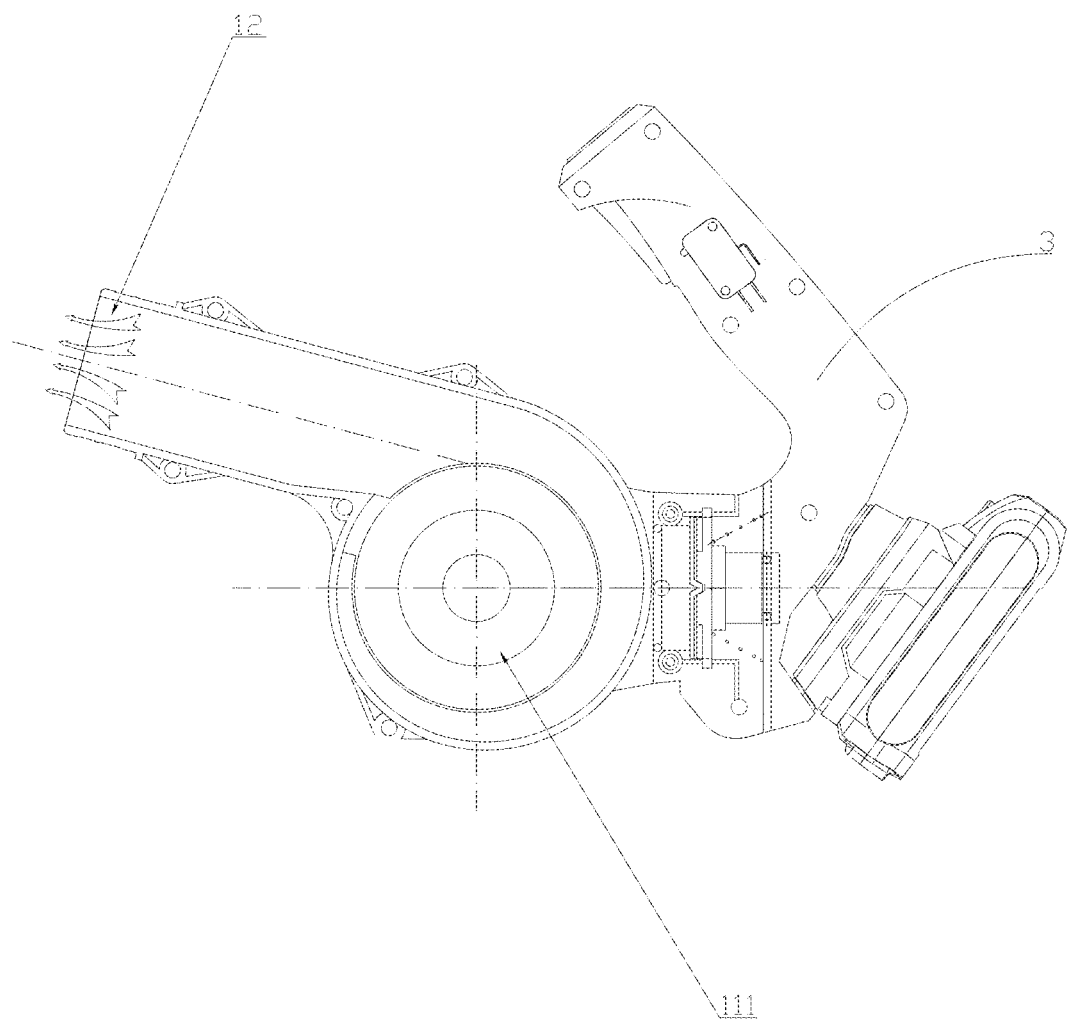
FIG. 3 is a section view sectioning along a shell.
Figure 4:
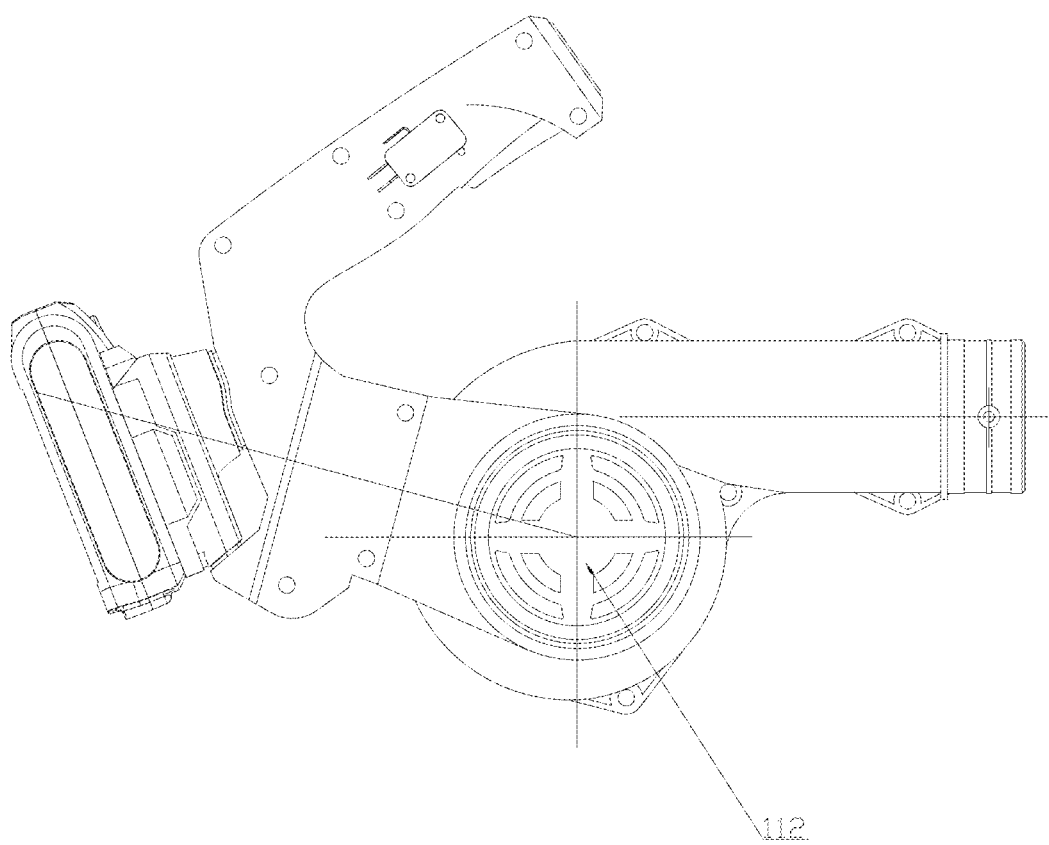
FIG. 4 is a rear view of an air blower in the present disclosure.
Figure 5:
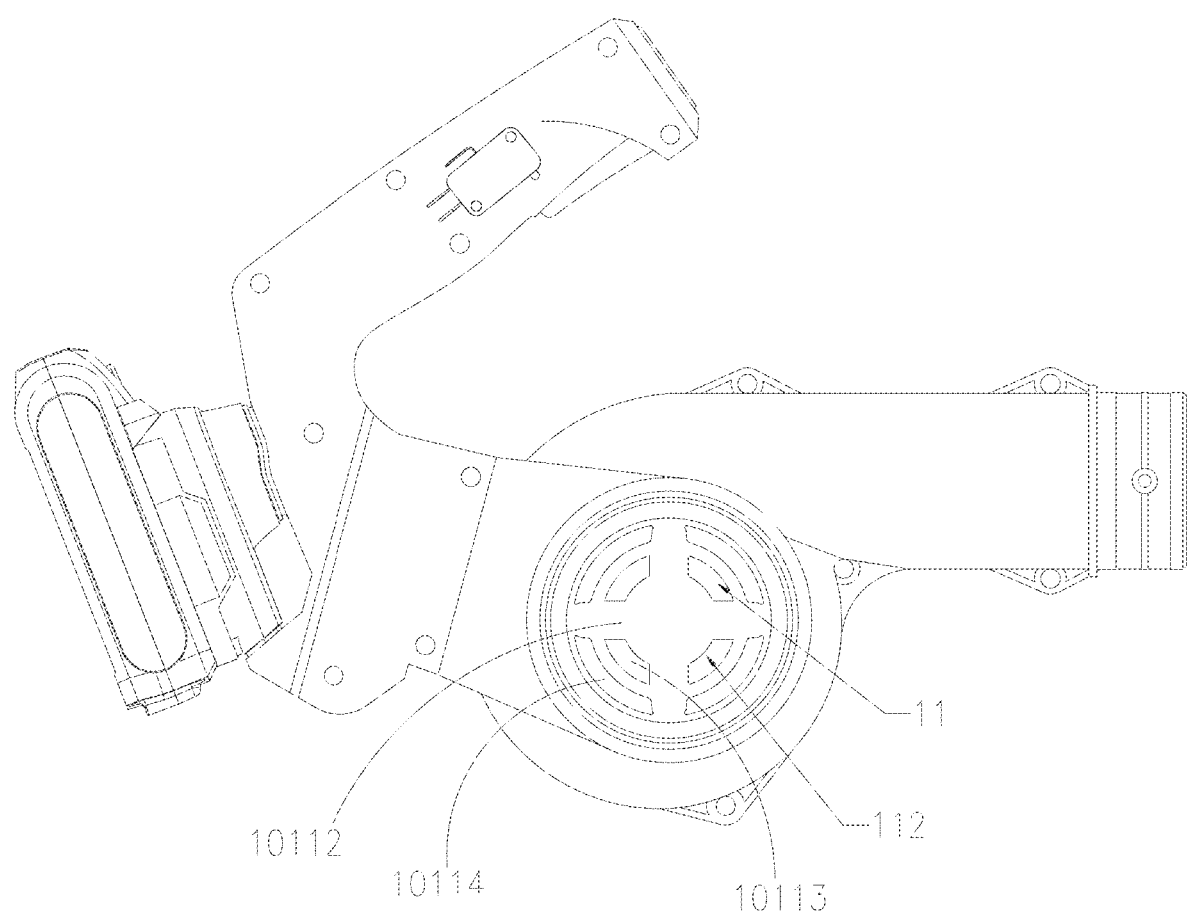
FIG. 5 is another rear view of an air blower in the present disclosure.
Figure 6:
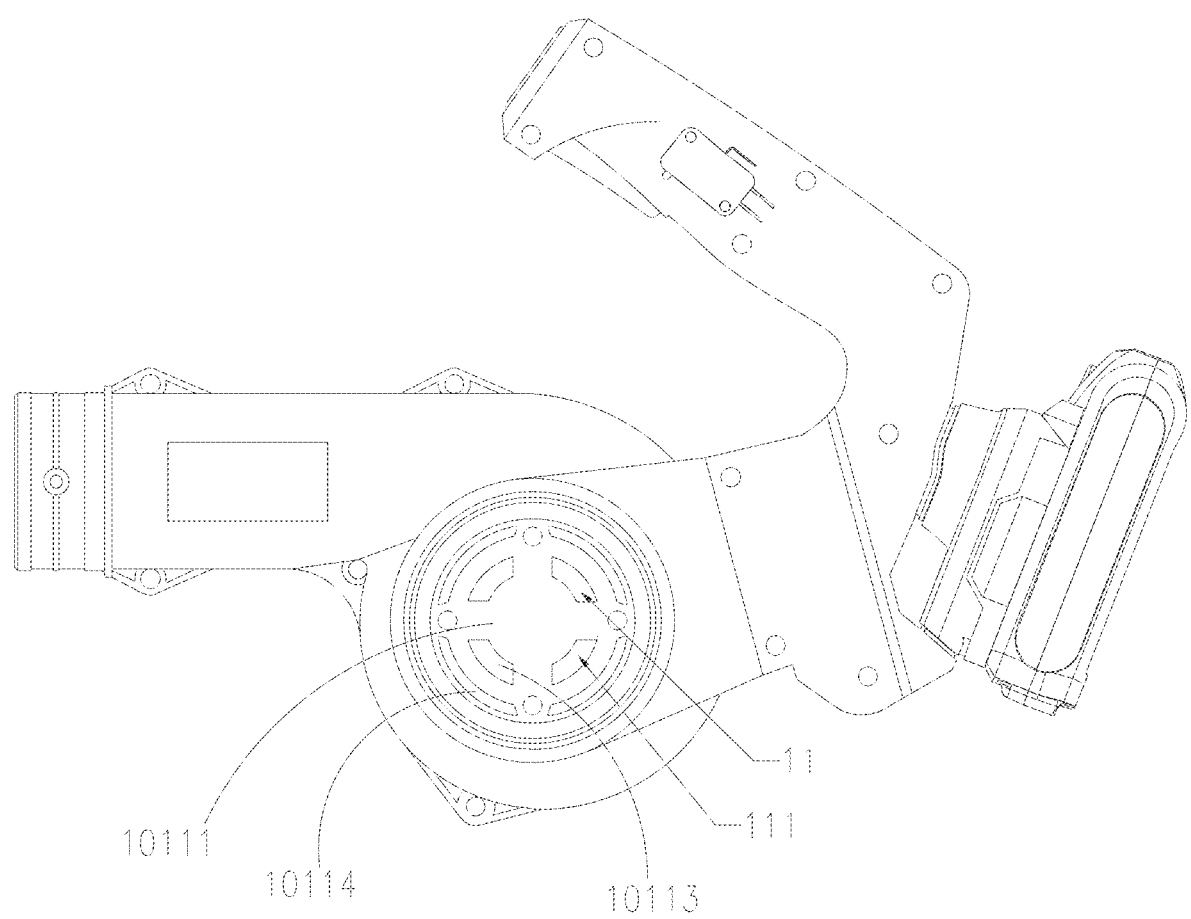
FIG. 6 is a front view of an air blower in the present disclosure.

Referring to FIG. 1 to FIG. 6, an air blower includes a shell 1 and an air supply device 2. The shell 1 is provided with an air inlet 11 and an air outlet 12. The air supply device 2 is arranged inside the shell 1, and the air supply device 2 is located between the air inlet 11 and the air outlet 12. The air supply device 2 includes a fan blade assembly 21, one side of the fan blade assembly 21 is provided with a first wind wheel 211, the other side of the fan blade assembly 21 is provided with a second wind wheel 212, and the first wind wheel 211 and the second wind wheel 212 are used for driving air flow to pass through the air inlet 11 and the air outlet 12 in sequence. The fan blade assembly 21 is provided with a first wind wheel 211 and a second wind wheel 212. The effect of increasing the air volume is achieved with the design of double wind wheels.

In the embodiment, the air supply device 2 also includes a motor 23, and the motor 23 is provided with a driving rotating shaft 231. The air supply device 2 also includes a support 24. The motor 23 is arranged inside the support 24. The support 24 is provided with a first connecting part 241. The support 24 is connected with the shell 1 through the first connecting part 241. The driving rotating shaft 231 goes through the support 24 and is connected with the fan blade 21 assembly. The motor 23 is used for driving the fan blade assembly 21 to rotate so as to produce high-speed airflow. The motor 23 is fixed in the shell 1 through the support 24.

In the embodiment, the air supply device 2 also includes a gasket 25. The gasket 25 is arranged between the motor 23 and the fan blade assembly 21. A connecting hole 213 is also formed in the fan blade assembly 21. The connecting hole 213 sleeves the rotating shaft 231. The gasket 25 is arranged between the motor 23 and the fan blade assembly 21. The motor 23 is avoided from being in direct contact with the fan blade assembly 21 to play a role of shock absorption.

In the embodiment, the fan blade assembly 21 is also provided with a partition plate 26. The partition plate 26 is located between the first wind wheel 211 and the second wind wheel 212 and used for partitioning the first wind wheel 211 and the second wind wheel 212. The first wind wheel 211 is provided with a plurality of first wind blades 2111. The second wind wheel 212 is provided with a plurality of second wind blades 2121. The first wind blades 2111 and the second wind blades 2121 are mutually staggered. The partition plate 26 is arranged between the first wind wheel 211 and the second wind wheel 212. The airflow passing through the first wind wheel 211 and the airflow passing through the second wind wheel 212 do not interfere with each other through the partition plate 26.

In the embodiment, the air inlet 11 includes a first air inlet unit 111 and a second air inlet unit 112. A first air flue 1112 is formed between the first air inlet unit 111 and the first wind wheel 211. A second air flue 2112 is formed between the second air inlet unit 112 and the second wind wheel 212. The first wind wheel 211 drives airflow to pass through the first air inlet unit 111, the first air flue 1112, the first wind wheel 211 and the air outlet 12 in sequence to form high-speed airflow. The second wind wheel 212 drives airflow to pass through the second air inlet unit 112, the second air flue 2112, the second wind wheel 212 and the air outlet 12 in sequence to form high-speed airflow. The theoretical air volume of the air blower when in use is increased through the design of double-sided air inlet.

In the embodiment, the air blower also includes a handle 3. The handle 3 is connected with the shell 1. The product can be used more conveniently by the user through the design of the handle 3.

In the embodiment, the air blower also includes an extension device 4. The extension device 4 is detachably arranged at the air outlet 12. The extension device 4 includes an air outlet extension tube 41 and an air outlet nozzle 42. One end of the air outlet extension tube 41 is detachably connected with the air outlet 12, and the other end of the air outlet extension tube 41 is detachably connected with the air outlet nozzle 42. Through the above-mentioned structure, the effect of prolonging the air flue is achieved by using the air outlet extension tube 41 and the air outlet nozzle 42 under the condition that the air outlet 12 is short in specific usage scenarios.

In the embodiment, the partition plate is provided with an upper surface and a lower surface, the first wind blades are connected to the upper surface of the partition plate, and the second wind blades are connected to the lower surface of the partition plate. Wherein, the number of the first wind blades is at least two, and the number of the second wind blades is at least two. Specifically, the shape of the first wind blade is the same as that of the second wind blade. Further, the height of the first wind blade is the same as that of the second wind blade, the width of the first wind blade is the same as that of the second wind blade, and the thickness of the first wind blade is the same as that of the second wind blade. Still further, the partition plate is a flat partition plate, the upper surface of the partition plate is a flat upper surface, and the lower surface of the partition plate is a flat lower surface. Still further, the partition plate is a circular partition plate. Still further, the wind wheels are located between the first air inlet unit 111 and the second air inlet unit 112. Still further, the first air inlet unit 111 is arranged on a left side wall 10111 of the shell, and the second air inlet unit 112 is arranged on a right side wall 10112 of the shell. Still further, the first air inlet unit 111 is arranged facing towards the second air inlet unit 112. Still further, the first air inlet unit 111 and/or the second air inlet unit 112 at least include/includes first air inlet holes 10113 and second air inlet holes 10114, and the sizes of the first air inlet holes 10113 and the second air inlet holes 10114 are different. Still further, the second air inlet unit 112 at least includes first air inlet holes 10113 and second air inlet holes 10114, the first air inlet holes 10113 are smaller than the second air inlet holes 10114, and the first air inlet holes 10113 and the second air inlet holes 10114 are arranged in sequence from the center of the right side wall 10112 to the edge of the right side wall 10112. Still further, the first air inlet holes 10113 and the second air inlet holes 10114 are all fan-shaped first air inlet holes 10113. Through the above-mentioned structure, the arrangement of the partition plate, the first air inlet unit and the second air inlet unit is realized effectively, the design is reasonable, and the theoretical air volume of the air blower when in use is increased effectively.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. An air blower, comprising:
    a shell, the shell being provided with an air inlet and an air outlet; and
    an air supply device, the air supply device being arranged inside the shell, and the air supply device being located between the air inlet of the shell and the air outlet of the shell; the air supply device comprising a fan blade assembly, one side of the fan blade assembly being provided with a first wind wheel, the other side of the fan blade assembly being provided with a second wind wheel, and the first wind wheel and the second wind wheel being used for driving airflow to pass through the air inlet of the shell and the air outlet of the shell in sequence,
    wherein the air inlet of the shell comprises a first air inlet unit and a second air inlet unit, a first air flue is formed between the first air inlet unit and the first wind wheel, a second air flue is formed between the second air inlet unit and the second wind wheel, the first wind wheel drives the airflow to pass through the first air inlet unit, the first air flue, the first wind wheel and the air outlet of the shell in sequence to further form a high-speed airflow, and the second wind wheel drives the airflow to pass through the second air inlet unit, the second air flue, the second wind wheel and the air outlet of the shell in sequence to further produce the high-speed airflow.

2. The air blower according to claim 1, wherein the air supply device comprises a motor, the motor is provided with a driving rotating shaft, the air supply device comprises a support, wherein the motor is arranged inside the support, the support is provided with a first connecting part, the support is connected to the shell through the first connecting part, and the driving rotating shaft goes through the support and is connected to the fan blade assembly.

3. The air blower according to claim 2, wherein the air supply device further comprises a gasket, the gasket is arranged between the motor and the fan blade assembly, a connecting hole is formed in the fan blade assembly, and the connecting hole sleeves the rotating shaft.

4. The air blower according to claim 1, wherein the fan blade assembly is provided with a partition plate, the partition plate is located between the first wind wheel and the second wind wheel and used for partitioning the first wind wheel and the second wind wheel, the first wind wheel is provided with a plurality of first wind blades, the second wind wheel is provided with a plurality of second wind blades, and the first wind blades and the second wind blades are mutually staggered.

5. The air blower according to claim 1, comprising a handle, wherein the handle is connected to the shell.

6. The air blower according to claim 1, comprising an extension device, wherein the extension device is detachably arranged at the air outlet of the shell.

7. The air blower according to claim 6, wherein the extension device comprises an air outlet extension tube and an air outlet nozzle, one end of the air outlet extension tube is detachably connected to the air outlet of the shell, and the other end of the air outlet extension tube is detachably connected with the air outlet nozzle of the extension device.

8. The air blower according to claim 4, wherein the partition plate of the blade assembly is provided with an upper surface and a lower surface, the first wind blades are connected to the upper surface of the partition plate of the blade assembly, and the second wind blades are connected to the lower surface of the partition plate of the blade assembly.

9. The air blower according to claim 4, wherein a number of the first wind blades is at least two, and a number of the second wind blades is at least two.

10. The air blower according to claim 4, wherein a shape of the first wind blade is the same as a shape of the second wind blade.

11. The air blower according to claim 4, wherein a height of the first wind blade is the same as a height of the second wind blade, a width of the first wind blade is the same as a width of the second wind blade, and a thickness of the first wind blade is the same as a thickness of the second wind blade.

12. The air blower according to claim 8, wherein the partition plate of the blade assembly is a flat partition plate, an upper surface of the partition plate of the blade assembly is a flat upper surface, and a lower surface of the partition plate of the blade assembly is a flat lower surface.

13. The air blower according to claim 4, wherein the partition plate is a circular partition plate.

14. The air blower according to claim 1, wherein the first wind wheel and the second wind wheel are located between the first air inlet unit and the second air inlet unit.

15. The air blower according to claim 1, wherein the first air inlet unit is arranged on a left side wall of the shell, and the second air inlet unit is arranged on a right side wall of the shell.

16. The air blower according to claim 15, wherein the first air inlet unit is facing towards the second air inlet unit.

17. The air blower according to claim 15, wherein the first air inlet unit and/or the second air inlet unit comprise/comprises first air inlet holes and second air inlet holes, and sizes of the first air inlet holes and the second air inlet holes are different.

18. The air blower according to claim 15, wherein the second air inlet unit at least comprises first air inlet holes and second air inlet holes, the first air inlet holes are smaller than the second air inlet holes, and the first air inlet holes and the second air inlet holes are arranged in sequence from a center of the right side wall to an edge of the right side wall.

19. The air blower according to claim 17, wherein the first air inlet holes and the second air inlet holes are all fan-shaped first air inlet holes.

\* \* \* \* \*